June 27, 1950     E. STREIFTHAU     2,512,841
BICYCLE PEDAL

Filed Oct. 7, 1947

Inventor

Edgar Streifthau

By Clarence A. O'Brien
and Harvey B. Jacobson
Attorneys

Patented June 27, 1950

2,512,841

UNITED STATES PATENT OFFICE 2,512,841

BICYCLE PEDAL

Edgar Streifthau, Middletown, Ohio

Application October 7, 1947, Serial No. 778,331

3 Claims. (Cl. 74—594.4)

This invention relates to new and useful improvements in pedals for bicycles, motorcycles and similar types of vehicles and more particularly to a pedal construction having roller bearing assemblies between the pedal shaft and the hub of the pedal to provide anti-friction means for the pedal.

An important object of the present invention is to provide a novel construction for the shaft or axle of the pedal and for securing the axle in the hub of the pedal.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
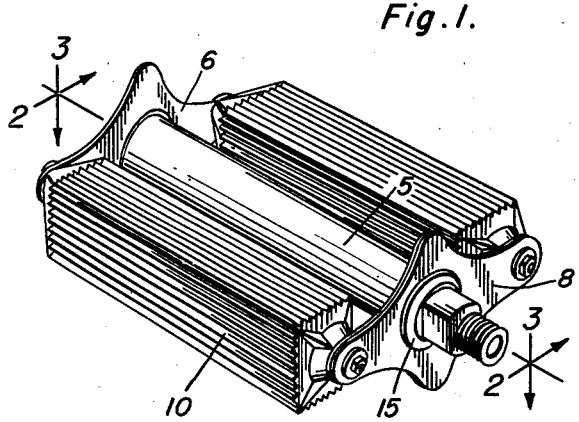
Figure 1 is a perspective view of the pedal constructed in accordance with the present invention.

Referring now to the drawing in detail wherein for the purpose of illustration, I have disclosed a preferred embodiment of the invention, the numeral 5 designates the tubular hub of the pedal to the outer end of which is positoned an outer end plate 6 and to the inner end of which is positioned a pair of inner end plates 7 and 8 positioned in confronting relation with respect to each other. Between the outer and inner end plates extend bolts 9 on which the rubber pads 10 are mounted to extend longitudinally of the hub 5 at diametrically opposite sides thereof.

Figure 2:
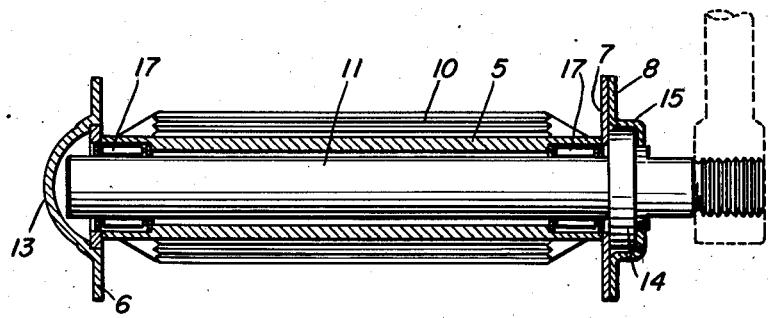
Figure 2 is a longitudinal sectional view taken on the line 2—2 of Figure 1.
Figure 3:
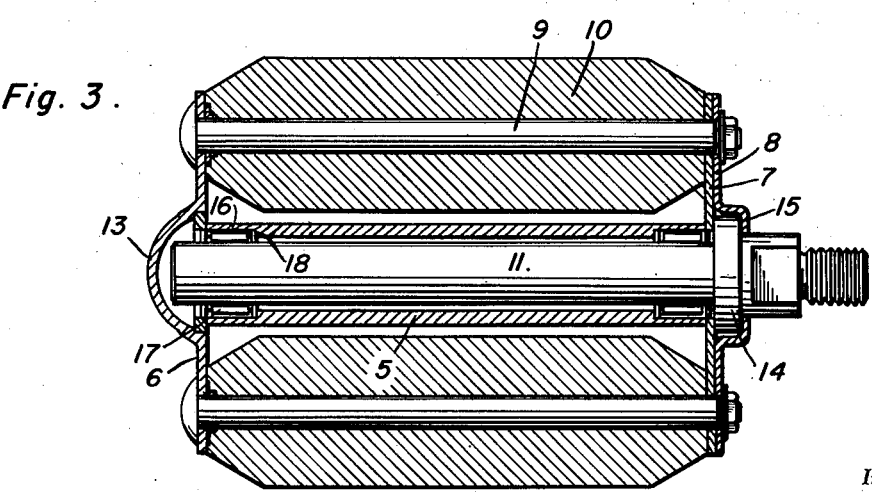
Figure 3 is a longitudinal sectional view taken on the line 3—3 of Figure 1.

An axle or shaft 11 extends through the hub 5, the outer end of the axle projecting beyond the outer end of the hub and enclosed in an internal recess 13 at the inner surface of the outer end plate 6. A flange 14 is integrally cast or otherwise suitably secured to the axle 11 adjacent its inner end and is positioned in an annular pocket 15 formed at the center of the inner plate 8 to hold the flange between the inner plate 7 and the inner plate 8 as shown in Figures 2 and 3 of the drawing and to thus hold the axle 11 against end play relative to the hub 5.

The inner and outer ends of the hub 5 are machined to increase the internal diameter thereof as shown at 16 to provide a race-way in which roller or needle bearing assemblies 17 are mounted and held against shoulders 18 at the inner edges of the race-way 16.

From the foregoing it will be apparent that the increased internal diameter 16 at the inner and outer ends of the hub 5 provides a simple and practical method of forming a race-way for roller or needle bearing assemblies to provide anti-friction means between the axle and the hub of the pedal and the flange 14 at the inner end of the axle holds the axle in position.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A bicycle pedal including a tubular hub having end portions internally increased in diameter to form bearing assembly recesses, an axle journaled in the hub, roller bearing assemblies positioned in said recesses, inner and outer end plates at the ends of the hub, said outer plate having a central internal recess loosely receiving the outer end of said axle and forming a lubricant receiving pocket, a flange on the axle closing the inner end of said hub, a retaining plate having an annular pocket receiving the flange to hold the axle against endwise movement in the hub, bolts connecting the end plates and holding the retaining plate to the inner end plate, and resilient pads carried by said bolts.

2. The combination of claim 1 wherein said central recess is provided with an annular depression in its inner wall, and a stop ring mounted in said annular depression and forming an abutment for the outer end of said hub.

3. A bicycle pedal including a tubular hub having end portions internally increased in diameter to form bearing assembly recesses, said hub having inner and outer end portions, an axle journaled in the hub, roller bearing assemblies positioned in said recesses, inner and outer end plates at the ends of the hubs, the inner end portion of said hub abutting the inner face of the inner end plate, said outer end plate having a central internal recess loosely receiving the outer end of the axle and forming a lubricant receiving pocket, a flange on the axle resting against the outer surface of the inner end plate, a retaining plate having an open pocket receiving the flange, said flange having an outer surface and said open pocket having a bearing portion resting against the outer surface of the flange to hold the flange between the bearing portion of said retainer plate and the outer surface of the inner end plate, bolts connecting the end plates and holding the retainer plate against the inner end plate, resilient pads mounted on the bolts, said central recess having an annular depression in its inner wall, and a stop ring mounted in said annular depression and forming an abutment for the outer end portion of said hub.

EDGAR STREIFTHAU.

REFERENCES CITED

The following references are of record in the file of this patent:

UNITED STATES PATENTS

| Number | Name | Date |
|---|---|---|
| 341,946 | Richardson | May 18, 1886 |
| 1,144,518 | Yahle | June 29, 1915 |
| 1,352,446 | Glanz | Sept. 14, 1920 |
| 1,972,701 | Carlson et al. | Sept. 4, 1934 |

FOREIGN PATENTS

| Number | Country | Date |
|---|---|---|
| 5,244 of 1879 | Great Britain | June 18, 1880 |